A. HAMMER.

Brewing.

No. 1,905. Reissued March 21, 1865.

WITNESSES
Am Thomson
Wm H. Morison

INVENTOR
A Hammer

N. PETERS. Photo-Lithographer, Washington, D. C.

UNITED STATES PATENT OFFICE.

ADOLPH HAMMER, OF NEW YORK, N. Y.

IMPROVEMENT IN BREWING.

Specification forming part of Letters Patent No. 21,195, dated August 17, 1858; Reissue No. 1,905, dated March 21, 1865.

*To all whom it may concern:*

Be it known that I, ADOLPH HAMMER, of the city, county, and State of New York, have invented a new and useful Improvement in Brewers' Mash Apparatus, or, more properly, an Improved Process of Brewing; and I do hereby declare that the following is a full, clear, and exact description thereof, which will enable others skilled in the art to make and use the same, reference being had to the accompanying drawings, forming part of this specification, in which—

Figure 1:
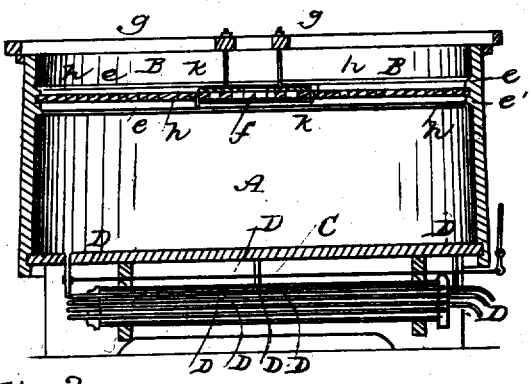
Figure 2:
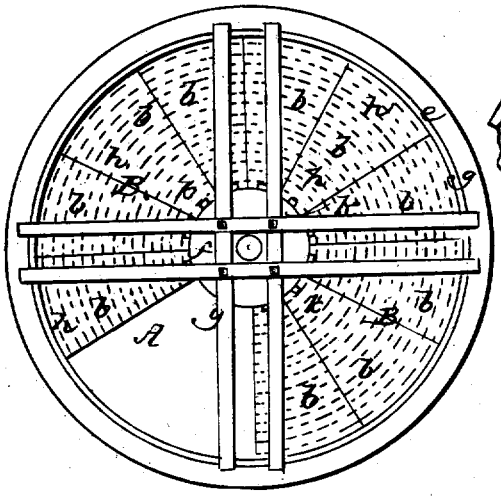
Figure 3:
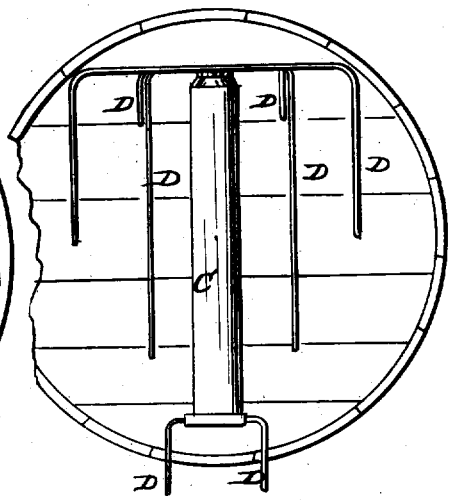

Figure 1 represents a vertical central section of this invention. Fig. 2 is a plan view of the perforated horizontal partition arranged in the upper part of the tun. Fig. 3 is a similar view of the steam-heater situated outside the tun and connecting therewith by suitable pipes.

Similar letters of reference indicate like parts.

In the brewers' mash apparatus as heretofore constructed there is no sufficient provision made for bringing the temperature of the mash to the degree proper for producing the chemical action required without a liability of subjecting portions of the mash to such an excessive heat as to prevent the subsequent productions of the whole amount of saccharine extract, or matter which the malt is capable of yielding. Furthermore, the malt, while being heated, is not protected against the influence of the atmospheric air, which not only exerts a cooling, but also a decomposing or oxidizing, effect, whereby the yield of saccharine extract or matter is still further reduced.

To remedy these defects is the object of this invention.

It consists in the arrangement on the outside of the mash-tun and in combination therewith of a heating-vessel, so that after the first part of the mashing operation (consisting in the mechanical mixing of the ground malt and water together in the tun) has been completed the temperature of the mash may, without any liability of injuring the same by overheating, be raised to the required degree by drawing therefrom through the said heater any suitable quantity of the thin fluid extract of the malt which may have passed through the usual false bottom, and then returning it into the tun, or, in other words, so that a continuous current of hot water or wort can be passed through the malt in the tun, and this current, being brought in contact with all the malt, raises the temperature of the same gradually and uniformly to the desired degree.

The invention consists also in the application to a mash-tun of one or more horizontal perforated partitions in such a manner that, by keeping a quantity of liquid above said partition, the malt in the tun is protected against the cooling and decomposing influence of the atmospheric air.

Referring to the drawings, A is the mash-tun; B, the removable perforated partition; C, the heating-vessel; and D D, the conduit-pipes leading through the same from the bottom of the interior of the tun, the usual "rakes" and "false bottom" of the tun, not having any necessary connection in illustrating the present invention, are not shown in the drawings.

The partition B is fixed horizontally across within the tun at about one-fourth of the whole inner height of the same below its upper end. It is constructed and fixed so as to be readily moved therefrom for cleansing the tun by being divided radially into a number of parts, *b b*, each part resting securely against displacement by the pressure of the contents of the tun, with its broader end between two flanges or projections, *e e'*, which are fixed on the inner side of the tun, and with its narrower end in a double flanged holder, *f*, which is made of metal and suspended by bolts from the frame *g*, so that the usual rake-shaft may pass through its center. Each of these separate parts of the partition B is perforated with numerous small holes *h h*, which are enlarged at the under side of the partition in a well-known manner to prevent choking. The recess between the two flanges of the holder *f* is deeper than the length of the pieces *b*, required for their support therein, so as to allow of their narrower ends being passed sufficiently far into the said recess of the holder *f* to allow of their broader ends being passed freely over the edge of the fixed upper projection, *e*, preparatory to inserting the said broader ends between the said two projections *e* and *e*, and when so inserted they are prevented from slipping out therefrom by the insertion of a pin, *k*, down through the smaller end of each, so that it shall bear against the outer edges of the flanges of the said holder.

The heating-vessel C is a long cylindrical metallic vessel, (say from six to fifteen feet long and one foot in diameter, dependent upon the size of the tun,) which is supported in nearly a horizontal position directly beneath the mash-tun. It has a series of conduit pipes, D D, each passing separately and longitudinally through it, and all extending therefrom so that their upper end shall pass up through a different part of the bottom of the tun and open into the space which is below the usual false bottom, while their other ends extend outwardly from the heater, so as to reach an open receiver of any suitable kind, to be provided for the purpose, from which the extract (to be run from the tun through the said heater for the purpose of being warmed, as will hereinafter be described) may afterward, by pumping or otherwise, be returned into the upper part of the tun as occasion may require. The said pipes D D are fixed steam-tight through the ends of the heating-cylinder C, and the latter also provided with supply and outlet pipes connected with a steam-generator of any suitable kind, so that steam can be maintained therein when required for the purpose of heating the conduit-pipes and their contents, or the heating may be effected by any other suitable means. Each of the conduit-pipes is also fitted with a stop-cock between the heater and the bottom of the tun, and so arranged as to enable the operator conveniently to open or close the same, as occasion may require.

The capacity of the space between the partition B and the false bottom of the tun should be adapted to the quantity of the mash to be made at one operation, or, vice versa, the mash to the space.

Operation: As the mixture called the "mash" is being produced in the tun, its temperature becomes too low to excite the subsequent chemical action necessary for producing the required amount of saccharine matter or extract from the malt, and it must be heated in such a manner as not to overheat any portion of the mash if the best and most economical results are obtained. This is effected by means of the heating-vessel C and the conduit-pipes D D in the following manner: Steam being supplied continually to the interior of the vessel C from any appropriate source during the warming process, the operator, as occasion may require, opens the stop-cocks in the conduit-pipes D D, and thus permits the thin fluid extract which may have passed through the false bottom of the tun to flow through the heating-vessel C to the receiver before mentioned. From this vessel he then returns it into the upper part of the tun, from whence, passing freely through the perforated partition B, it gradually sinks through the mash, and thus necessarily diffusing the increased temperature which it has acquired in its passage through the heater C, it enables the operator gradually and uniformly to raise the temperature of the whole mash to the degree proper for exciting the chemical action required. After the temperature of the mash has thus been brought to the degree which is most proper for the purpose the stop-cocks in the conduit-pipes D D are all closed by the operator, and warm water then runs into the tun from above, which water, through the instrumentality of the perforated partition B, in contact with the mash below, is prevented from either perforating, breaking up, or causing the mash to float thereon, as hereinbefore, and it being thus kept from penetrating the mash so confined closely between the fixed partition B and the false bottom, it necessarily forms a stratum over the same, which not only aids in preserving the warmth of the mash, but perfectly protects it also from any contact with the atmosphere during the time required for the water so to remain, and afterward, when the usual outlet-valve of the tun is opened, the said partition also aids in retarding and distributing the said stratum of warm water, so that it is caused to sink intimately and gradually down between all the insoluble remnants of the malt, and thus to wash out and carry with it in solution the whole of the saccharine extract or matter which may have been produced therefrom.

It will be perceived that by means of a heating-vessel arranged on the outside of a mash-tun and connected with its interior substantially in the manner described the temperature of the mash can be easily and gradually raised by the operator to the exact degree required to produce the necessary chemical action therein without any liability of his injuring it, or any part thereof, by an excessive heat, because neither the malt itself nor any of the thick mash can come into direct contact with the heater, which latter is the case where a coil or pipe or other steam-heater is placed within the tun, and in such direct contact with the thick semi-fluid mash as to overheat those portions of it which are in such contact before a sufficient diffusion of the heat can take place therefrom to warm the whole mass up to the degree required for the purpose; nor can the thin saccharine matter or extract which is being drawn off through the heater C, as described, become injuriously heated thereby, because, being in rapid motion at the time, none of its particles can remain in direct contact with the heated pipes D D a sufficient length of time to produce such an effect, while the increase of temperature which the fluid receives from the heater is amply sufficient for the purpose of warming the whole mash as required when it is returned to the same in the tun, as described, and consequently also without the liability of overheating any of the mash thereby, as is the case when successive portions of hot water or steam are forced upwardly into the tun from below the false bottom for the purpose of heating or for washing out the extractive matter.

Two other important advantages, though incident to this part of my invention, arise from the fact that the heater being entirely on the outside of the tun affords more convenient access for repairing, and also does not hinder the workman in the necessary operation of cleaning the tun.

Having thus described my invention, I claim as new and desire to secure by Letters Patent—

1. The arrangement of a heater, C, on the outside of a mash-tun, and in combination therewith, constructed and operating substantially in the manner and for the purposes set forth.

2. Heating the contents of a mash-tun by a current of liquid which is drawn therefrom and returned to it, and while passing from and to the malt has its temperature gradually raised by means substantially as herein described, or any equivalent means, for the purposes specified.

3. The arrangement of one or more horizontal perforated partitions B in the upper part of a mash-tun, constructed as herein set forth, or in any other suitable manner, so that the malt is prevented from rising to the surface of the liquid and from coming in contact with the external atmosphere.

4. Making the partition B in sections, substantially as and for the purpose described.

A. HAMMER.

Witnesses:
M. M. LIVINGSTON,
E. I. COOPER.